United States Patent
Zinndorf et al.

(10) Patent No.: US 6,739,234 B2
(45) Date of Patent: May 25, 2004

(54) PNEUMATIC BRAKE BOOSTER WITH VARIABLE FORCE TRANSMISSION RATIO

(75) Inventors: Albert Zinndorf, Sessenbach (DE); Gerd Puscher, Andernach (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 10/403,559

(22) Filed: Mar. 31, 2003

(65) Prior Publication Data

US 2003/0168910 A1 Sep. 11, 2003

Related U.S. Application Data

(63) Continuation of application No. PCT/EP01/11256, filed on Sep. 28, 2001.

(30) Foreign Application Priority Data

Oct. 4, 2000 (DE) .......................................... 100 49 106

(51) Int. Cl.$^7$ ................................................. F15B 9/10
(52) U.S. Cl. ...................................................... 91/369.2
(58) Field of Search .............................. 91/369.2, 369.3

(56) References Cited

U.S. PATENT DOCUMENTS

| | | |
|---|---|---|
| 5,699,713 A | 12/1997 | Mortimer |
| 6,269,731 B1 * | 8/2001 | Gautier et al. ............. 91/369.2 |
| 6,494,125 B2 * | 12/2002 | Hannus et al. ............. 91/369.2 |

FOREIGN PATENT DOCUMENTS

| | | |
|---|---|---|
| DE | 40 20 904 | 1/1992 |
| EP | 0 705 190 | 4/1996 |
| GB | 2 253 018 | 8/1992 |
| JP | 10230840 | 9/1998 |
| WO | 99/26826 | 6/1999 |

* cited by examiner

Primary Examiner—Edward K. Look
Assistant Examiner—Michael Leslie
(74) Attorney, Agent, or Firm—MacMillan, Sobanski & Todd, LLC

(57) ABSTRACT

A pneumatic brake booster (10), in particular for motor vehicles, is described. The pneumatic brake booster (10) has a control valve (22) for controlling a pneumatic pressure difference, a force input element (24) for actuating the control valve (22), a force output element (38) for transmitting the braking force as well as a reaction disk (34) of elastomer material disposed between the force output element (38) and the force input element (24). Disposed between the reaction disk (34) and the force input element (24) and acting upon the reaction disk (34) is a unit (30) for altering the force transmission ratio between the force input element (24) and the force output element (38) in dependence upon the force exerted upon the force input element (24). The unit (30) comprises a displaceable inner piston (50) as well as an outer piston (54), which surrounds the radially outer side of the inner piston (50) and is displaceable relative to the inner piston (50). The inner piston (50) has at the radially outer side or the outer piston (50) at the radially inner side a depression (50') for receiving material particles, which depression (50') is covered by the in each case other piston (50, 52).

12 Claims, 3 Drawing Sheets

PNEUMATIC BRAKE BOOSTER WITH VARIABLE FORCE TRANSMISSION RATIO

CROSS REFERENCE TO RELATED APPLICATIONS

This application is a continuation of International Application No. PCT/EP01/11256 filed Sep. 28, 2001, which claimed priority to German Patent Application No. 100 49 106.5 filed Oct. 4, 2000, the disclosures of which are incorporated herein by reference.

BACKGROUND OF INVENTION

The invention relates to a pneumatic brake booster, in particular for motor vehicles, comprising a control valve for controlling a pneumatic pressure difference, a force input element for actuating the control valve, a force output element for transmitting the braking force, a reaction disk of elastomeric material disposed between the force output element and the force input element, and a unit disposed between the reaction disk and the force input element and acting upon the reaction disk for altering the force transmission ratio between the force input element and the force output element in dependence upon the force exerted upon the force input element, wherein the unit comprises an inner piston and an outer piston surrounding the radially outer side of the inner piston and displaceable relative to the inner piston.

Such a brake booster designed as a vacuum brake booster for a motor vehicle is known from EP 0 705 190 B1, and corresponding U.S. Pat. No. 5,699,713 which is incorporated by reference herein.

Normally, pneumatic brake boosters have a fixed force transmission ratio, i.e. an actuating force introduced by means of the input element into the brake booster is transmitted from a smaller area associated with the input element to a larger area associated with the force output element. This occurs mostly via a so-called reaction disk of elastomeric material, which behaves in a manner similar to a liquid. Under certain circumstances, e.g. in an emergency braking situation, it is however desirable to provide a user with as much braking force assistance as possible so that from a specific input force as high a brake pressure as possible can be generated.

In the cited EP 0 705 190 B1 it is therefore proposed that, after a specific input force has been exceeded, the area acting upon the reaction disk be reduced by means of the unit for altering the force transmission ratio. Said reduced area penetrates further into the elastic reaction disk compared to the non-reduced area (given the same input or actuating force) so that the control valve of the brake booster opens to a correspondingly greater extent, thereby resulting in a correspondingly higher differential pressure in the brake booster and hence in an increased force amplification.

In the brake booster known from EP 0 705 190 B1, the inner piston and the outer piston of the unit for altering the force transmission ratio act directly upon the reaction disk. As a result of the two pistons acting directly upon the reaction disk a fine dust of abraded elastomeric material arises. A gap, which is disposed between a stop for the outer piston and the surface of the outer piston facing said stop and is required for reliable operation of the unit for altering the force transmission ratio, is progressively used up by the dust collecting inside the device for altering the force transmission ratio. Once the gap is totally used up, it is no longer possible after a high-pressure braking operation for the brake pressure to be cancelled in a controlled manner. Rather, braking force assistance generated by the brake booster terminates only when the input force summoned up by the driver is sharply reduced. The reason for this is that, when the gap is used up, the hydraulic reaction forces acting upon the outer piston are introduced not into the force input element but entirely into the control valve housing.

The fact that despite a reduction of the input force summoned up by the driver the braking effect hardly alters is perceived by the driver as a deterioration of the actuating performance of the vehicle brakes. The driver gets the impression that his influence upon the performance of the vehicle brakes is decreasing, which may lead to critical driving situations.

SUMMARY OF THE INVENTION

The object of the invention is to provide a pneumatic brake booster of the type described initially, the actuating performance of which is less strongly dependent on wear phenomena.

Proceeding from a brake booster of the described type, said object is achieved according to the invention in that on the one hand the inner piston has, radially at the outside, a depression for receiving material particles which is covered by the outer piston and in that on the other hand the outer piston has, radially at the inside, a depression for receiving material particles which is covered by the inner piston. Material particles, which migrate counter to actuating direction and are caused e.g. by wear of the reaction disk, are consequently collected in the depression of the inner piston before they are able to deposit inside the unit for altering the force transmission ratio. The influence of material particles on the operation of the unit for altering the force transmission ratio is therefore reduced in a sustained manner. For said reason, the wear dependence of the actuating performance of the vehicle brakes is also reduced.

The depression for receiving material particles is best arranged with respect to the inner piston and the outer piston in such a manner that it is covered in all functional positions of the unit for altering the force transmission ratio. The depression may e.g. be formed in such an area of the outer piston that it is constantly, i.e. in all functional positions, covered by the inner piston. The depression is in this event preferably formed in a front area of the outer piston facing the reaction disk. The same applies when the inner piston is provided with a depression. In this case, however, the depression should be provided in a rear area of the inner piston which faces away from the reaction disk. In this way it is possible to achieve that material particles that got into the depression stay there. This counteracts unintentional migration of the entire material particles.

The depression preferably takes the form of a groove, for example a groove extending fully or at least in areas in the peripheral direction of one of the pistons. Such a construction of the depression guarantees to a particular extent that migrating material particles may be reliably collected inside the depression. The dimensions of the depression are advantageously selected in such a way that the maximum amount of material arising over the lifetime of the brake booster can be accommodated.

The inner piston may be connected at its end facing the force input element to an e.g. cylindrically constructed plunger. It is then possible for the outer piston to be guided so as to be slidably displaceable on a shank of the plunger. Such a construction removes the need for separate guidance of the outer piston and leads to a compact construction. The plunger and the inner piston are preferably of an integral construction.

To further simplify the structural design and to reduce the size of the unit for altering the force transmission ratio, in preferred embodiments of the brake booster according to the invention the plunger shank is provided at its end facing the force input element with a dish, against which an elastic element may be supported, which preloads the inner piston towards a stop formed on the outer piston. The stop limiting the axial displaceability of the inner piston counter to actuating direction is preferably disposed radially at the inside of the hollow-cylindrical outer piston.

The elastic element preloading the outer piston into its initial position may have a linear spring characteristic. Equally, however, the elastic element may have a progressively rising spring characteristic, with the result that the braking force assistance of the brake booster according to the invention, starting with the movement of the outer piston out of its initial position up to reaching an end position of the outer piston, progressively increases.

The outside diameter of the outer piston is advantageously greater than the inside diameter of the dish so that the outer piston may easily be supported against the stop for the outer piston, the stop being formed e.g. on the control valve housing. Although the dish may also be constructed integrally with the plunger shank, the provision of dish and shank as separate structural components is preferred. Providing dish and shank as separate components allows particularly easy assembly of the unit for altering the force transmission ratio. This is described in detail later with reference to the drawings.

According to a preferred embodiment of the invention, the unit for altering the force transmission ratio takes the form of a cartridge which, after having been preassembed, can be inserted into the control valve housing. The cartridge may be integrated without a high outlay into many pre-existing brake boosters. There is moreover the possibility of offering one and the same brake booster with or without variable force transmission by fitting or not fitting the cartridge into the brake booster.

DETAILED DESCRIPTION OF THE INVENTION

Figures 1, 2:
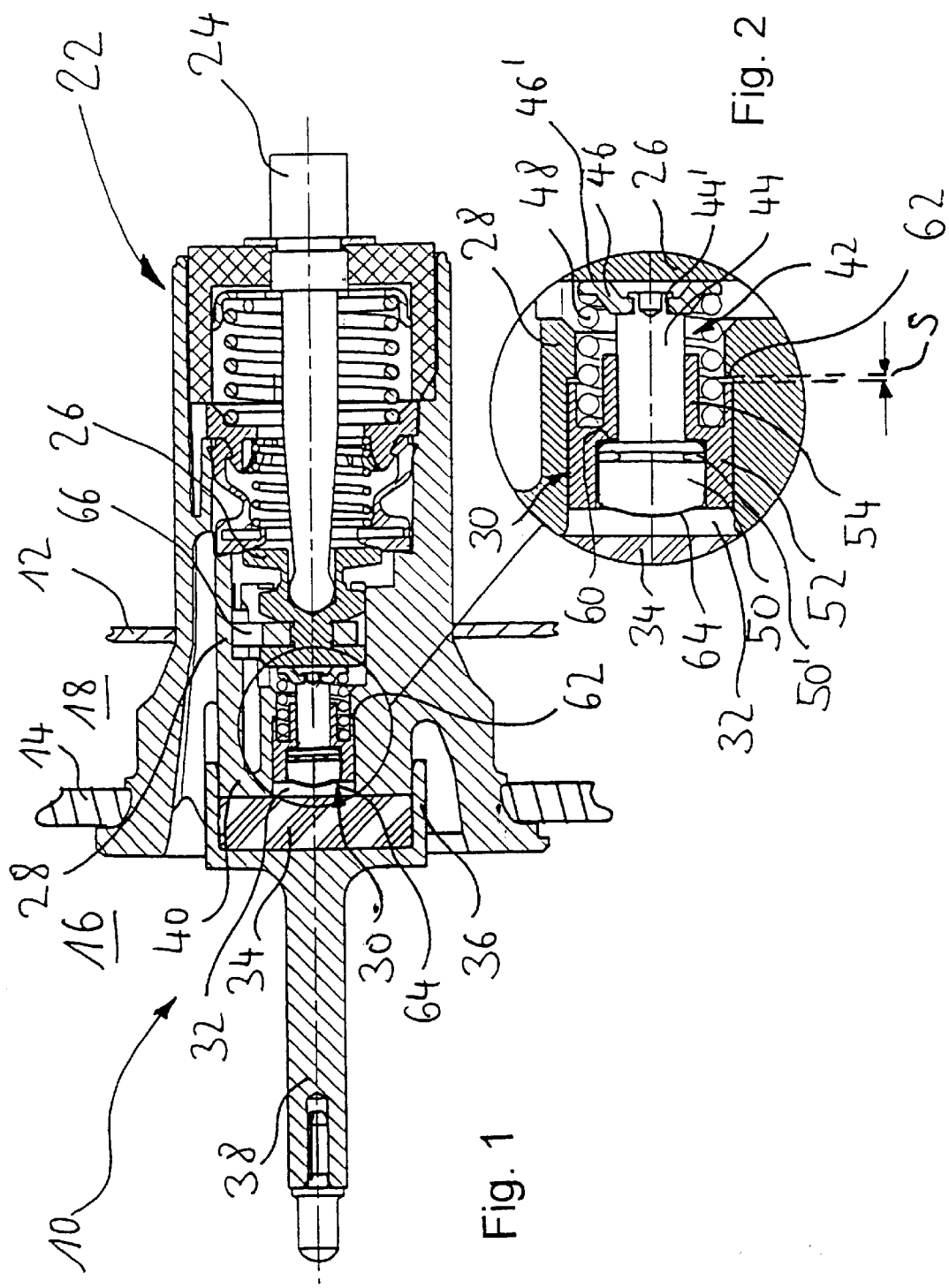
FIG. 1 a brake booster of the invention according to a first embodiment with a unit for altering the force transmission ratio between force input element and force output element in longitudinal section.
FIG. 2 a cutout from FIG. 1 showing the unit for altering the force transmission ratio at an enlarged scale, wherein the unit is illustrated in a state such as arises when the brake booster is not actuated.

FIG. 1 shows in longitudinal section a first embodiment of a vacuum brake booster 10 according to the invention having a housing 12, which is divided by a movable wall 14 into a vacuum chamber 16 and a working chamber 18. Whereas during operation of the brake booster 10 the vacuum chamber 16 is in constant communication with a vacuum source, the working chamber 18 may be selectively brought into connection either with a vacuum or with atmospheric pressure. For said purpose use is made of a control valve 22, which in dependence upon the actuation of a force input element 24, which is usually connected to a brake pedal (not shown here), controls valve seats provided in the control valve 22 in such a way that atmospheric pressure or excess pressure may flow into the working chamber 18 or that, upon termination of an actuation of the brake booster 10, the vacuum chamber 16 is brought into connection with the working chamber 18 in order to evacuate the latter again. As the construction and function of such a brake booster 10 are well known to experts in the art, in the following only parts and the function of said parts which are of relevance to the present invention are described in detail.

The above mentioned force input element 24 is connected to a valve piston 26, which is accommodated in an axially displaceable manner in a housing 28 of the control valve 22. The side of the valve piston 26 axially opposite to the force input element 24 is adjoined by a unit 30 for altering the force transmission ratio, which is described in greater detail below and is inserted as a preassembled cartridge in relation to the drawings from the left into a stepped recess 32 of the control valve housing 28. Said unit 30 is adjoined in actuating direction by a reaction disk 34, which is made of elastomeric material and accommodated in an end portion 36, extended in a cup-shaped manner, of a force output element 38 of the brake booster 10. The force output element 38 is guided by means of its cup-shaped end portion 36 on a hub-shaped end portion 40 of the control valve housing 28.

Upon an actuation of the brake booster 10, an actuating force exerted upon the force input element 24 effects a displacement of the latter to the left, i.e. into 6the brake booster 10. Said displacement is transmitted to the valve piston 26 coupled to the force input element 24 and leads to the opening of that valve seat which allows atmospheric pressure to flow into the working chamber 18. The valve piston 26 transmits said displacement by means of the unit 30 for altering the force transmission ratio to the reaction disk 34, the behaviour of which is ideally comparable to the behaviour of a hydraulic fluid. This means that the force exerted upon the force input element 24 is transmitted from the smaller cross-sectional area of the unit 30 by means of the reaction disk 34 to the greater cross-sectional area of the force output element 38 defined by the inside diameter of the cup-shaped end portion 36. The ratio of the smaller cross-sectional area of the unit 30 to the greater cross-sectional area of the reaction disk 34 defines the force transmission ratio of the brake booster 10.

The unit 30 for altering said force transmission ratio is now described in detail with reference to FIGS. 2 and 3. It comprises a plunger 42 having a shank 44 whose end facing the force input element 24 is connected to a dish 46. The dish 46 is used, on the one hand, to transmit force from the valve piston 26 to the unit 30 and, on the other hand, to support a compression spring 48 which is disposed coaxially with the plunger shank 44 and surrounds it. The plunger shank 44 and the dish 46 are constructed as separate components in order to facilitate assembly of the unit 30 for altering the force transmission ratio.

A circular opening is provided in the centre of the disk 46 through which a cylindrical extension 44' of the plunger shank 44, which has a smaller outside diameter than the plunger shank 44, extends. The fastening of the dish 46 to the plunger shank 44 may be effected in various ways. According to FIG. 2 the extension 44' is of a hollow cylindrical design so that the dish 46 may be fastened to the plunger shank 44 by beading. As FIG. 3 shows, fastening of the dish 46 to the plunger shank 44 may also be effected by means of a retaining ring 44", which engages behind the dish 46.

The dish 46 is trough-shaped and has an annular collar 46' extending in the direction of the force input element 24 and cooperating with the valve piston 26. The trough-shaped construction of the dish 46 and the provision of an annular collar 46' cooperating with the force input element 24 enable a reliable introduction of force from the valve piston 26 into the dish 46 and/or into the unit 30 for altering the force transmission ratio without the extension 44' that is used to connect the dish 46 to the plunger shank 44 being loaded with a force.

On the end of the plunger shank 44 remote from the dish 46 a cylindrical, circular inner piston 50 is disposed, which forms a part of the cross-sectional area of the unit 30 acting upon the reaction disk 34. In the embodiment, the plunger 42 and the inner piston 50 are of an integral construction. Disposed coaxially with said inner piston 50 is a hollow-cylindrical outer piston 52, which is guided by means of a collar 54 so as to be slidingly displaceable on the plunger shank 44 and of which the inside diameter in the region of the inner piston 50, apart from the usual tolerances, corresponds to the outside diameter of the inner piston 50. The outside diameter of the outer piston 52 is greater than the outside diameter of the dish 46 and corresponds substantially to the greatest diameter of the stepped recess 32 in the control valve housing 28.

The inner piston 50 has radially at the outside a depression in the form of a circumferential groove 50'. The groove 50' is used to receive material particles migrating counter to the actuating direction of the brake booster and, in particular, abraded particles of the reaction disk 34 which would otherwise deposit on a stop 60 provided for the inner piston 50 and formed in the hollow-cylindrical outer piston 52, and impair the ability to operate of the unit 30 for altering the force transmission ratio. The groove 50' is formed at an end of the inner piston 50 facing the force input element 24 and is dimensioned in such a way that it guarantees a long operating ability of the brake booster 10 and that material stresses in the inner piston 50 caused by clogging of the groove 50' are prevented.

Figure 3:
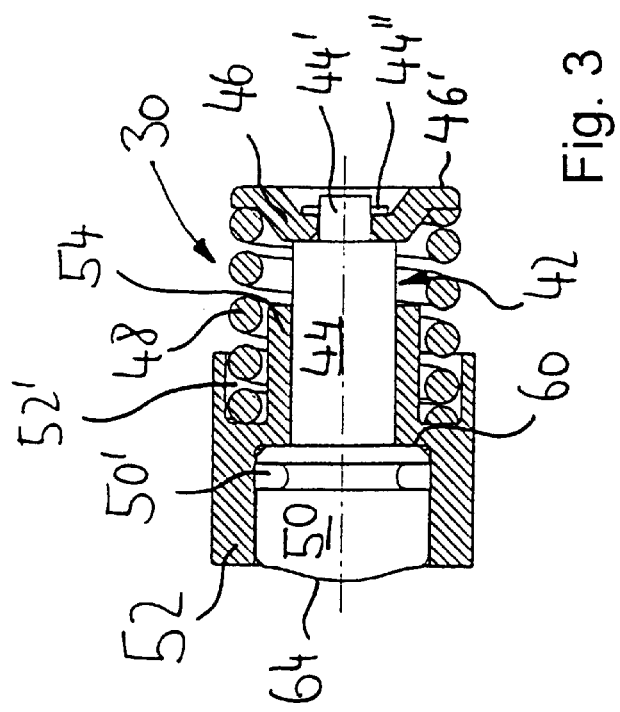
FIG. 3 a unit for altering the force transmission ratio, which is slightly modified compared to the unit illustrated in FIGS. 1 and 2 and takes the form of a preassembled cartridge, in longitudinal section.

FIG. 3 shows the unit 30 for altering the force transmission ratio as a separate subassembly in the form of a preassembled cartridge. As the unit 30 is assembled, first the plunger shank 44 is passed through the collar 54 of the outer piston 52 until the inner piston 50 constructed integrally with the plunger shank 44 comes to rest against the stop 60 formed radially at the inside of the outer piston 52. Then the compression spring 48 is slipped from the end remote from the inner piston 50 onto the collar 54 and, in so doing, is partially received inside a groove-shaped pocket 52' of the outer piston 52. Subsequently, the dish 46 is pushed counter to the action of the compression spring 48 onto the extension 44' of the plunger shank 44 and connected to the plunger shank 44 in the manner described above. The inner piston 50 is preloaded in its initial position against the stop 60 of the outer piston 52 by means of the preloaded compression spring 48 supported against the dish 46.

In the initial position of the unit 30 shown in FIGS. 1 to 3 and fixed by means of the stop 60, the areas of the inner piston 50 and the outer piston 52 facing the reaction disk 34 form a single flush area. In the initial position of the brake booster there is a specific axial clearance s between the end of the outer piston 52 remote from the reaction disk 34 and the stop 62 formed for the outer piston by a diameter reduction of the recess 32.

Figure 4:
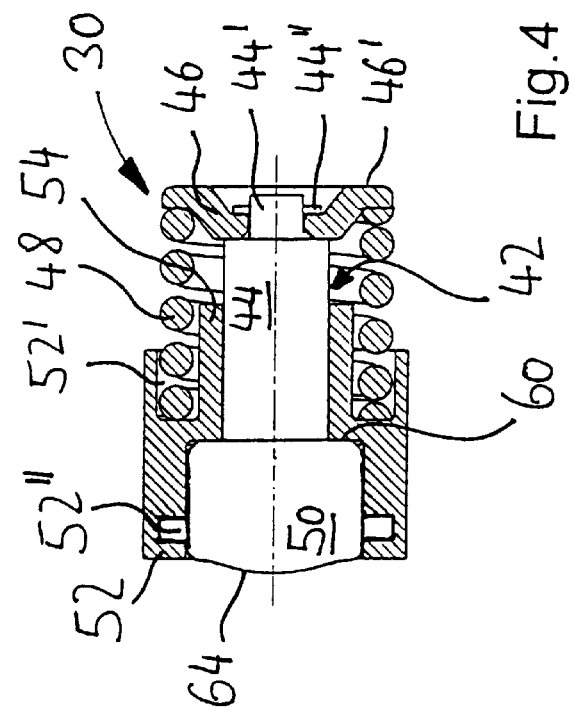
FIG. 4 a unit for altering the force transmission ratio intended for assembly in a brake booster according to a second embodiment of the invention, in a view according to FIG. 3, and FIG. 5 a diagram reproducing the variation of the transmission ratio of the brake booster according to the invention in dependence on the input force summoned up by the driver as well as the transmission ratio characterized by wear phenomena of a brake booster according to the prior art.

FIG. 4 illustrates a further possibility of designing a unit 30 for altering the force transmission ratio for a vacuum brake booster according to a second embodiment of the invention. Both the vacuum brake booster according to the second embodiment and the unit 30 for altering the force transmission ratio illustrated in FIG. 4 are functionally identical with the vacuum brake booster 10 and the unit 30 for altering the force transmission ratio of FIGS. 1 to 3.

In contrast, in the unit 30 for altering the force transmission ratio illustrated in FIG. 4 the depression, embodied by a groove 52", is formed radially inside at the outer piston 52. Said groove 52" is provided with respect to the reaction disk not shown in FIG. 4 in a front area of the outer piston 52 facing the not shown reaction disk. In contrast thereto, the groove 50' illustrated in FIG. 3 and formed radially outside at the inner piston 50 is arranged in an area of the inner piston 50 facing away from the reaction disk 34. By providing the groove 52" with respect to the reaction disk at the front of the outer piston 52 and the groove 50' at the rear of the inner piston 50 it is guaranteed that each one of the grooves 50', 52" is covered in all functional positions of the respective unit 30 for altering the force transmission ratio by the in each case oppositely located piston 50, 52. An unintentional migration of the collected material particles can thus be excluded.

The function of the unit 30 for altering the force transmission ratio explained in each case with reference to FIG. 3 and FIG. 4 in dependence upon the force exerted upon it by means of the valve piston 26 is as follows. When the brake pedal (not shown) coupled to the force input element 24 is depressed, this movement is transmitted from the force input element 24 to the valve piston 26 and from the latter to the dish 46. As a result, the entire unit 30 is displaced to the left and a raised portion 64 in the shape of a spherical segment provided on the inner piston 50 initially penetrates into the reaction disk 34.

Figure 5:
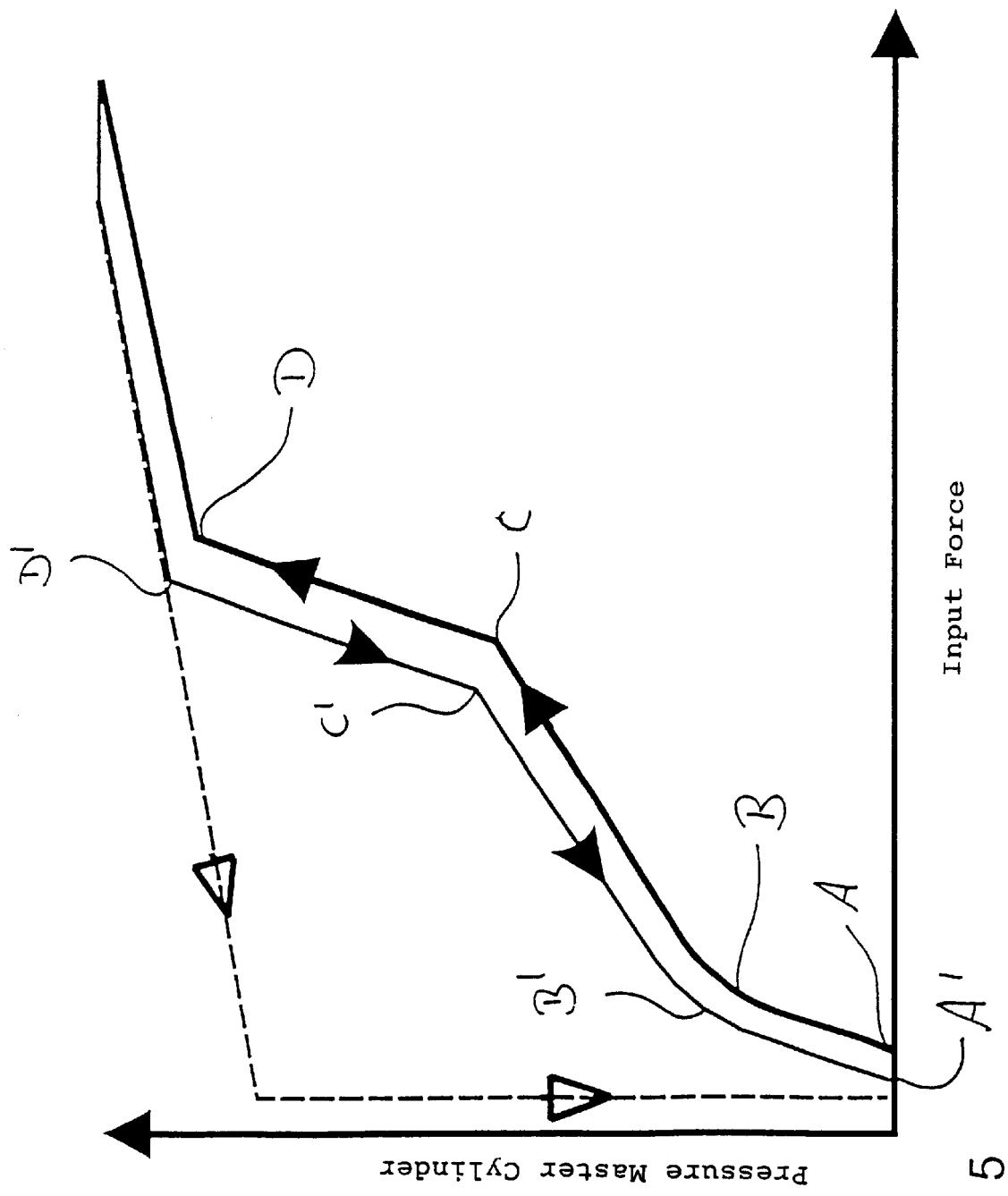

Because of the initially very small contact area between the raised portion 64 and the reaction disk 34, the piston 50 may penetrate relatively quickly into the reaction disk 34, which leads during the initial phase of an actuation of the brake booster to a rapid opening of the control valve 22 and hence to the rapid build-up of an assisting braking force. In the diagram of FIG. 5, which shows the brake pressure in a master cylinder (not shown here) acted upon by the force output element 38 plotted against the input force introduced by means of the force input element 24, this may be recognized by the—after surmounting of an initial play (point A)—steep rise of the master cylinder pressure (section between points A and B).

A further displacement of the force input element 24 leads after a short time to full-surface application both of the inner piston 50 and of the outer piston 52 against the reaction disk 34. The unit 30 is in said case displaced as a whole to the left, which is evident from a then greater clearance s between the stop 62 and the outer piston 52. The brake pressure, which has meanwhile built up in the non-illustrated master cylinder and reacts via the force output element 38, leads to the material of the reaction disk 34 being pressed slightly into the recess 32. The reaction force transmitted via the reaction disk 34 to the outer piston 52 is however not yet sufficient to compress the compression spring 48. In said state, therefore, the force transmission ratio of the brake booster 10 is determined by the ratio of the outside diameter of the outer piston 52 to the inside diameter of the cup-shaped end portion 36 accommodating the reaction disk 34.

Upon a further increase of the input force summoned up by means of the force input element 24, the inner piston 50 of the unit 30, which is connected by the plunger 42 rigidly to the valve piston 26, is displaced further to the left and hence is pressed deeper into the reaction disk 34. The accordingly higher brake pressure achieved in the master cylinder reacts via the reaction disk 34 also upon the outer piston 52 and is then sufficient to compress the compression spring 48. The outer piston 52 is consequently displaced relative to the inner piston 50 counter to the actuating direction of the brake booster and the clearance between the end of the outer piston 52 facing the stop 62 and the stop 62 is reduced.

Finally, when the input force is further increased, the end of the outer piston 52 facing the stop 62 comes into contact with the stop 62, which leads to "grounding" of the outer piston 52, i.e. the area of the outer piston 52 in contact with the reaction disk 34 then has no more influence upon the force transmission ratio of the brake booster 10. This corresponds in FIG. 5 to point C. Only the smaller area of the inner piston 50 is now effective, with the result that the force boosting ratio of the brake booster 10 then arises from the ratio of the outside diameter of the inner piston 50 to the inside diameter of the cup-shaped end portion 36. As the outside diameter of the inner piston 50 is smaller than the outside diameter of the outer piston 52, the force transmission ratio increases, as is evident from FIG. 4.

Upon a further increase of the input force, the inner piston 50 penetrates even deeper into the reaction disk 34 until a locking bar 66, which is connected to the valve piston 26 and extends into a radial recess of the control valve housing 28, abuts against the control valve housing 28. This corresponds in FIG. 5 to point D. A further increase of the input force can then be no longer boosted by the brake booster 10 and therefore leads to a correspondingly lower rise of the master cylinder pressure.

From the above functional description it is apparent that the slope and the course of the curve between points B and C reproduced in FIG. 5 depends on the characteristic of the compression spring 48. The slope of the said portion of the curve may be influenced by differing spring stiffnesses; such differing spring stiffnesses may even be provided in one and the same compression spring 48 (progressive spring characteristic) in order to influence the course of the force boosting ratio in the said curve portion in a desired manner.

When the brake is released, the described positions of the unit 30 are run through in reverse order. In said case, the curve illustrated in FIG. 5 successively follows points D', C', B' and A'. As may be seen from FIG. 4, the position of point A does not match the position of point A'. The same applies to points B and B', C and C' as well as D and D'. The input-force-dependent course of the brake pressure in the master cylinder consequently presents hysteresis phenomena.

In a prior art brake booster, because of the heavy deposits on the stop 60 for the inner piston 50, the gap s normally provided in the initial state of the brake booster between the stop 62 for the outer piston 52 and the outer piston 52 is completely used up. After a high-pressure braking operation it is therefore no longer possible for the brake pressure to be reduced in a controlled manner, as is illustrated in FIG. 5 by the dashed line. It is only after a sharp reduction of the input force that the braking force assistance of the brake booster may be disconnected, the disconnection being effected abruptly. The brake booster according to the invention, on the other hand, presents over the same operating period a much better actuating performance than prior art brake boosters.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Pneumatic brake booster, in particular for motor vehicles, comprising a control valve for controlling a pneumatic pressure difference, a force input element for actuating the control valve, a force output element for transmitting the braking force, a reaction disk of elastomeric material disposed between the force output element and the force input element, and a unit disposed between the reaction disk and the force input element and acting upon the reaction disk for altering the force transmission ratio between the force input element and the force output element in dependence upon the force exerted upon the force input element, the unit comprising an inner piston and an outer piston surrounding a radially outer side of the inner piston and displaceable relative to the inner piston, wherein the inner piston has at the radially outer side or the outer piston at the radially inner side a depression for receiving material particles, which depression is covered by the in each case oppositely located piston.

2. Brake booster according to claim 1, wherein the depression is a groove extending in peripheral direction of the piston.

3. Brake booster according to claim 1, wherein the inner piston is connected at its end facing the force input element to a plunger.

4. Brake booster according to claim 3, wherein the outer piston is guided so as to be slidingly displaceable on a shank of the plunger.

5. Brake booster according to claim 3, wherein the inner piston and the plunger are of an integral construction.

6. Brake booster according to claim 3, wherein the shank of the plunger has at its end facing the force input element a dish.

7. Brake booster according to claim 1, wherein the outer piston radially at the inside has a stop, which limits an axial displaceability of the inner piston relative to the outer piston counter to the actuating direction of the brake booster.

8. Brake booster according to claim 7, wherein in an initial position of the brake booster, the inner piston is preloaded towards the stop of the outer piston.

9. Brake booster according to claim 8, wherein an elastic element for generating the initial tension is provided, which is supported by a first end against the outer piston and by a second end against the plunger.

10. Brake booster according to claim 6, wherein the dish and the shank are constructed as separate components.

11. Brake booster according to claim 1, wherein a stop for the outer piston is formed on a housing of the control valve.

12. Brake booster according to claim 1, wherein the device for altering the force transmission ratio is designed as a preassembly unit in the form of a cartridge which, after preassembly has been effected, is insertable into the housing of the control valve.

* * * * *